United States Patent
Shen

(10) Patent No.: US 9,654,699 B2
(45) Date of Patent: May 16, 2017

(54) HIGH DYNAMIC RANGE IMAGING WITH REDUCED FRAME BUFFER

(71) Applicant: OMNIVISION TECHNOLOGIES, INC., Santa Clara, CA (US)

(72) Inventor: Jie Shen, Fremont, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 14/791,018

(22) Filed: Jul. 2, 2015

(65) Prior Publication Data

US 2017/0006207 A1    Jan. 5, 2017

(51) Int. Cl.
*H04N 5/235*    (2006.01)
*H04N 5/378*    (2011.01)
*H04N 5/376*    (2011.01)

(52) U.S. Cl.
CPC ......... *H04N 5/2353* (2013.01); *H04N 5/2355* (2013.01); *H04N 5/378* (2013.01); *H04N 5/3765* (2013.01)

(58) Field of Classification Search
CPC .... H04N 5/2353; H04N 5/2355; H04N 5/378; H04N 5/3765; H04N 5/2356; H04N 5/345; H04N 5/3532; H04N 5/3535; H04N 5/35581; H04N 5/355
See application file for complete search history.

(56) References Cited

U.S. PATENT DOCUMENTS

| | | | |
|---|---|---|---|
| 2010/0103194 A1 | 4/2010 | Chen et al. | |
| 2012/0188392 A1* | 7/2012 | Smith | H04N 5/2355 348/222.1 |
| 2012/0218426 A1* | 8/2012 | Kaizu | H04N 5/35554 348/208.4 |
| 2013/0057754 A1* | 3/2013 | Shimada | H04N 5/35581 348/362 |
| 2013/0076937 A1* | 3/2013 | Tajima | H04N 5/355 348/223.1 |

(Continued)

FOREIGN PATENT DOCUMENTS

WO    WO 2016/030301 A1    3/2016
WO    WO 2016/073527 A1    5/2016

OTHER PUBLICATIONS

U.S. Appl. No. 14/985,116, filed Dec. 30, 2015, Jie Shen.
ROC (Taiwan) Pat. App. No. 105116497—Notice of Allowance and Translated Search Report, mailed Dec. 30, 2016, 4 pages.

*Primary Examiner* — Jason Flohre
(74) *Attorney, Agent, or Firm* — Blakely Sokoloff Taylor & Zafman LLP

(57) ABSTRACT

A system and method for high dynamic range (HDR) imaging includes writing a first, second, and third sub-frame to a memory at a first, second, and third readout time, respectively, the first, second, and third sub-frame being generated by a same first sub-array of the array of image pixels. Subsequent to the third readout time, the first, second, and third sub-frames are sent to an image signal processor. Also subsequent to the third readout time, a fourth sub-frame is sent to the image sensor. The fourth sub-frame is generated by the same first sub-array of the array of image pixels. The fourth sub-frame bypasses the memory by being sent from an analog-to-digital converter to the image signal processor without being written to the memory.

16 Claims, 4 Drawing Sheets

(56) References Cited

U.S. PATENT DOCUMENTS

2015/0189187 A1\* 7/2015 Youn .................. H04N 5/23293
                                                         348/333.11
2015/0296158 A1\* 10/2015 Mansoorian ........... H04N 5/374
                                                            348/308

\* cited by examiner

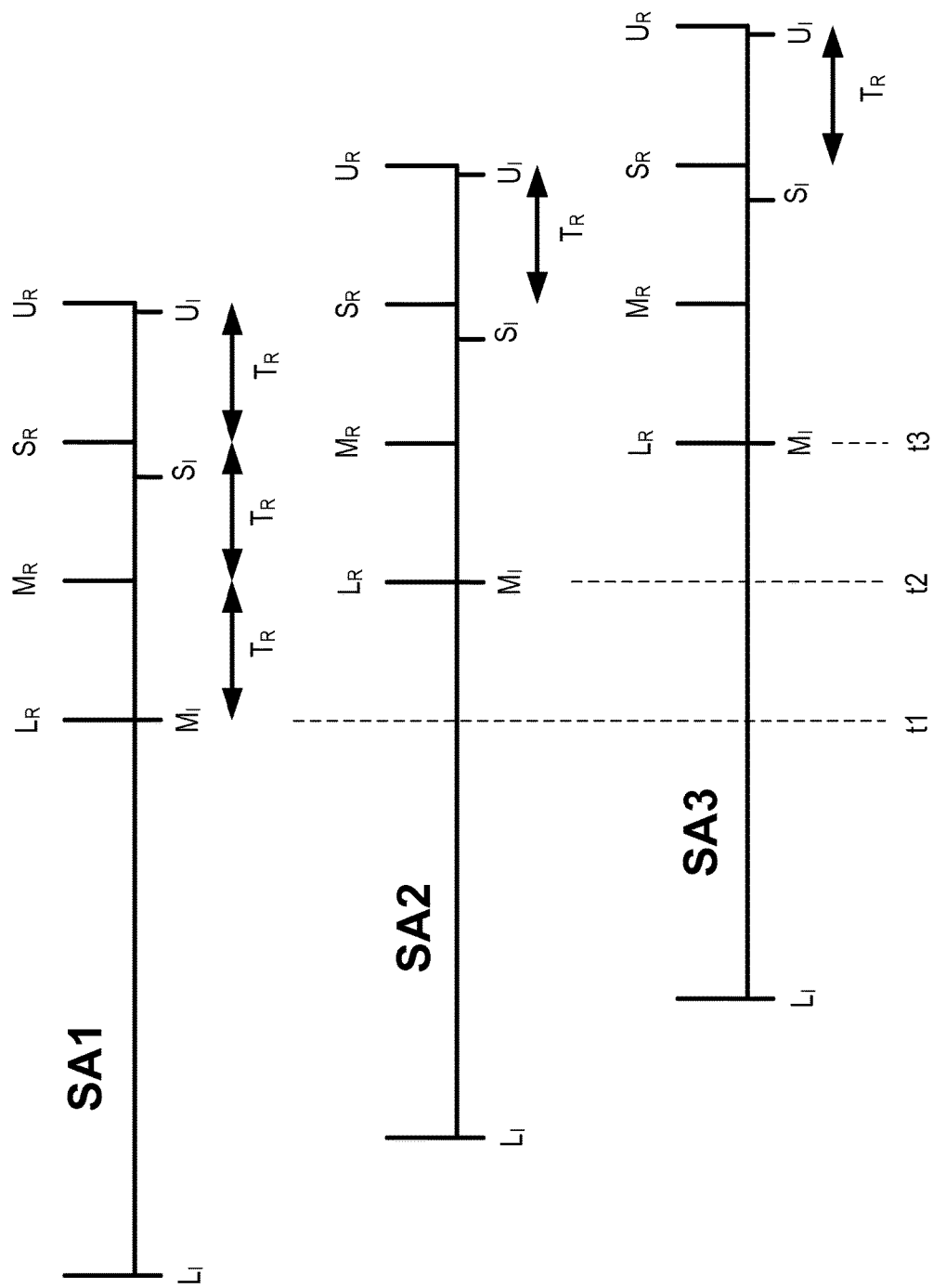

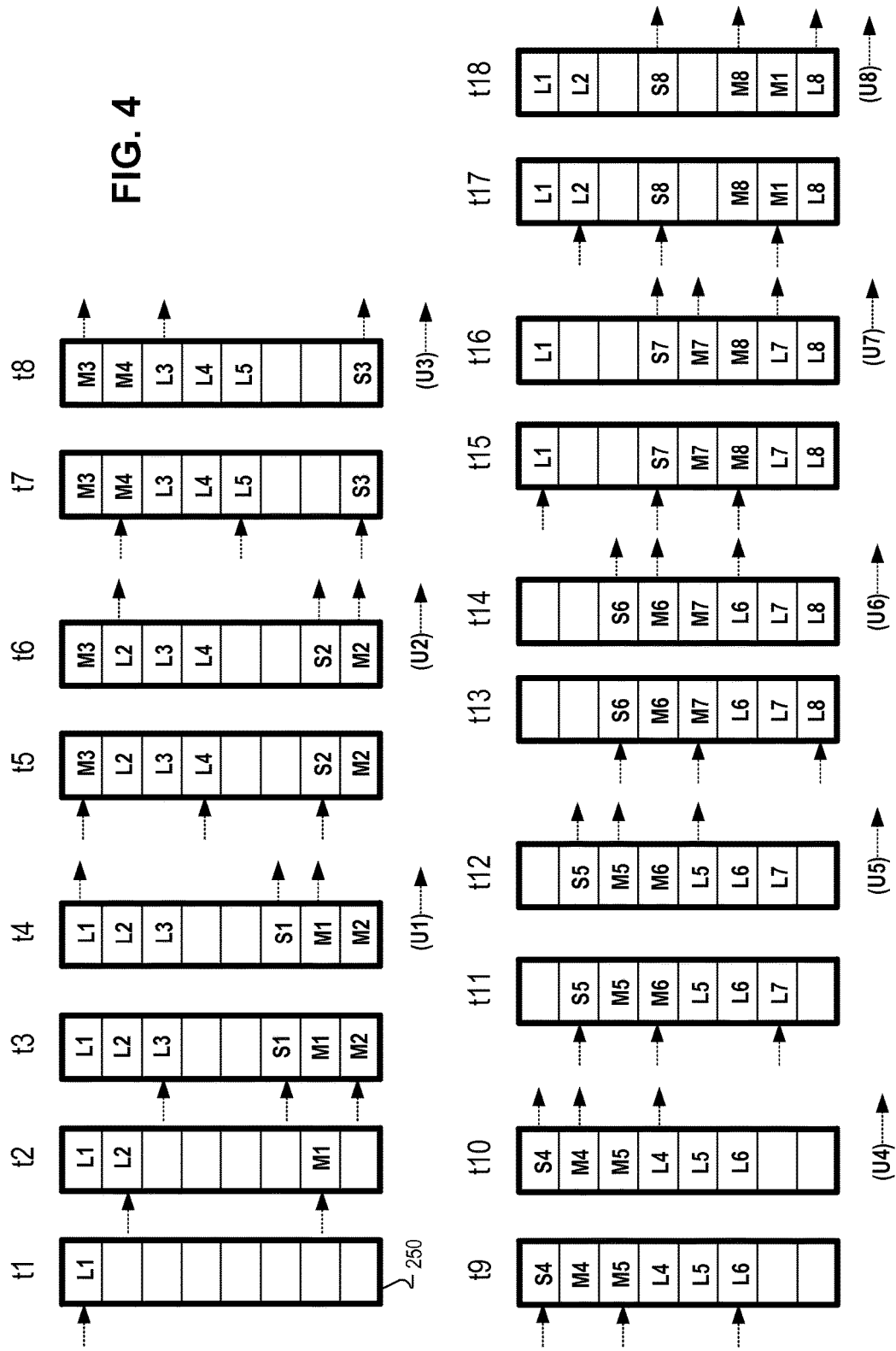

HIGH DYNAMIC RANGE IMAGING WITH REDUCED FRAME BUFFER

TECHNICAL FIELD

This disclosure relates generally to image sensors, and in particular to image sensors that capture high dynamic range images.

BACKGROUND INFORMATION

Standard image sensors have a limited dynamic range of approximately 60 to 70 dB. However, the luminance dynamic range of the real world is much larger. Natural scenes often span a range of 90 dB and over. In order to capture the highlights and shadows simultaneously, high dynamic range ("HDR") technologies have been used in image sensors to increase the captured dynamic range. One approach to HDR imaging is to initiate multiple exposures having different exposure periods with an array of image pixels. With different exposure/integration times or different sensitivities, one image sensor could initiate 2, 3, 4 or even more different exposures to generate an HDR image. However, capturing multiple exposures creates challenges to readout the multiple exposures in an acceptable time frame, especially in a video recording context. Therefore, improving readout architectures and techniques to improve readout throughput is desirable.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIG. 3 illustrates an example timing diagram showing different exposures of sub-arrays of the array of image pixels, in accordance with an embodiment of the disclosure.

FIG. 4 illustrates a timing diagram showing writing sub-frames to a memory, in accordance with an embodiment of the disclosure.

DETAILED DESCRIPTION

Embodiments of a system and method for high dynamic range (HDR) imaging are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
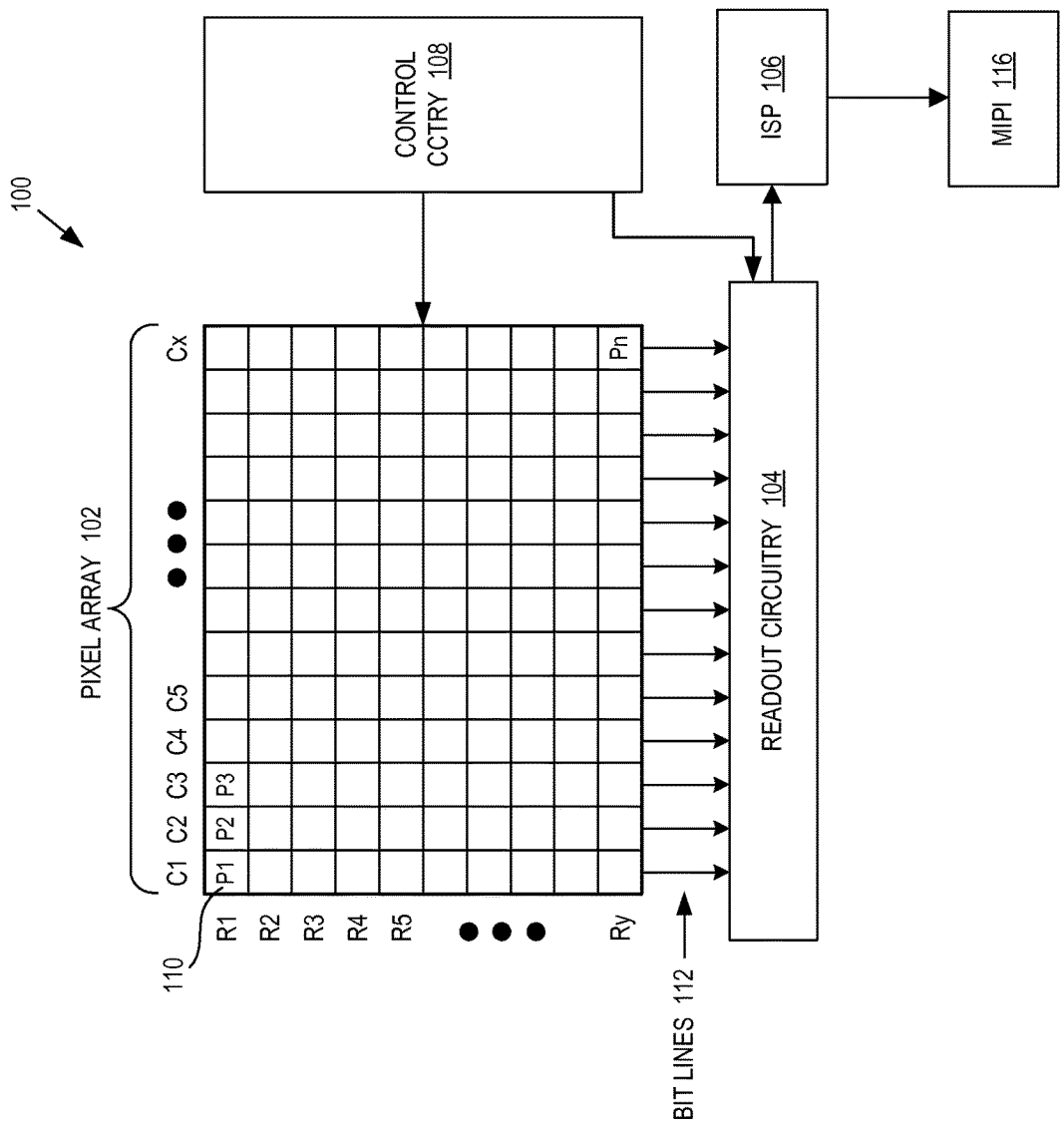
FIG. 1 illustrates a block diagram schematic of an example high dynamic range (HDR) imaging system including readout circuitry, in accordance with an embodiment of the disclosure.

FIG. 1 illustrates a block diagram schematic of an example high dynamic range (HDR) imaging system 100 that includes a pixel array 102, readout circuitry 104, control circuitry 108, Image Signal Processor ("ISP") 106, and Mobile Industry Processor Interface ("MIPI") 116, in accordance with an embodiment of the disclosure. Pixel array 102 is an array of image sensor pixels 110 that may be a Complimentary Metal-Oxide-Semiconductor ("CMOS") pixel array. As shown in the depicted example, pixel array 102 is coupled to control circuitry 108 and readout circuitry 104. Control circuitry 108 is coupled to pixel array 102 to control operational characteristics of pixel array 102 in order to capture digital images generated by image light received by pixel array 102. For example, control circuitry 108 may generate a shutter signal or a plurality of shutter signals for controlling image acquisition. Control circuitry 108 is also coupled to readout circuitry 104 so that control circuitry 108 can coordinate image acquisitions of pixel array 102 with reading out pixel array 102.

Control circuitry 108 may include a processor, a Field Programmable Gate Array ("FPGA"), or other logic. Control circuitry 108 may include memory to store settings and instructions to initiate HDR image captures. Control circuitry 108 may cause pixel array 102 to initiate a rolling shutter image capture.

In one example, pixel array 102 is a two-dimensional array of pixels 110 (e.g., pixels P1, P2 . . . , Pn). As illustrated, each pixel 110 is arranged into a row (e.g., rows R1 to Ry) and a column (e.g., column C1 to Cx) to acquire image data of a person, place, object, etc., which can then be used to render an image of the person, place, object, etc. Each pixel 110 may utilize 3-transistor ("3T") or 4-transistor ("4T") configurations, as is known in the art. In one example, after each pixel 110 has acquired its image data or image charge, the image data is read out by readout circuitry 104 as analog image signal through bit lines 112 (which may be column lines).

Readout circuitry 104 is coupled to receive the analog image signals from pixel array 102 and output digital image signals to ISP 106 for further image processing. Imaging system 100 optionally includes MIPI 116 when imaging system 100 is to be included in a mobile device.

Figure 2:
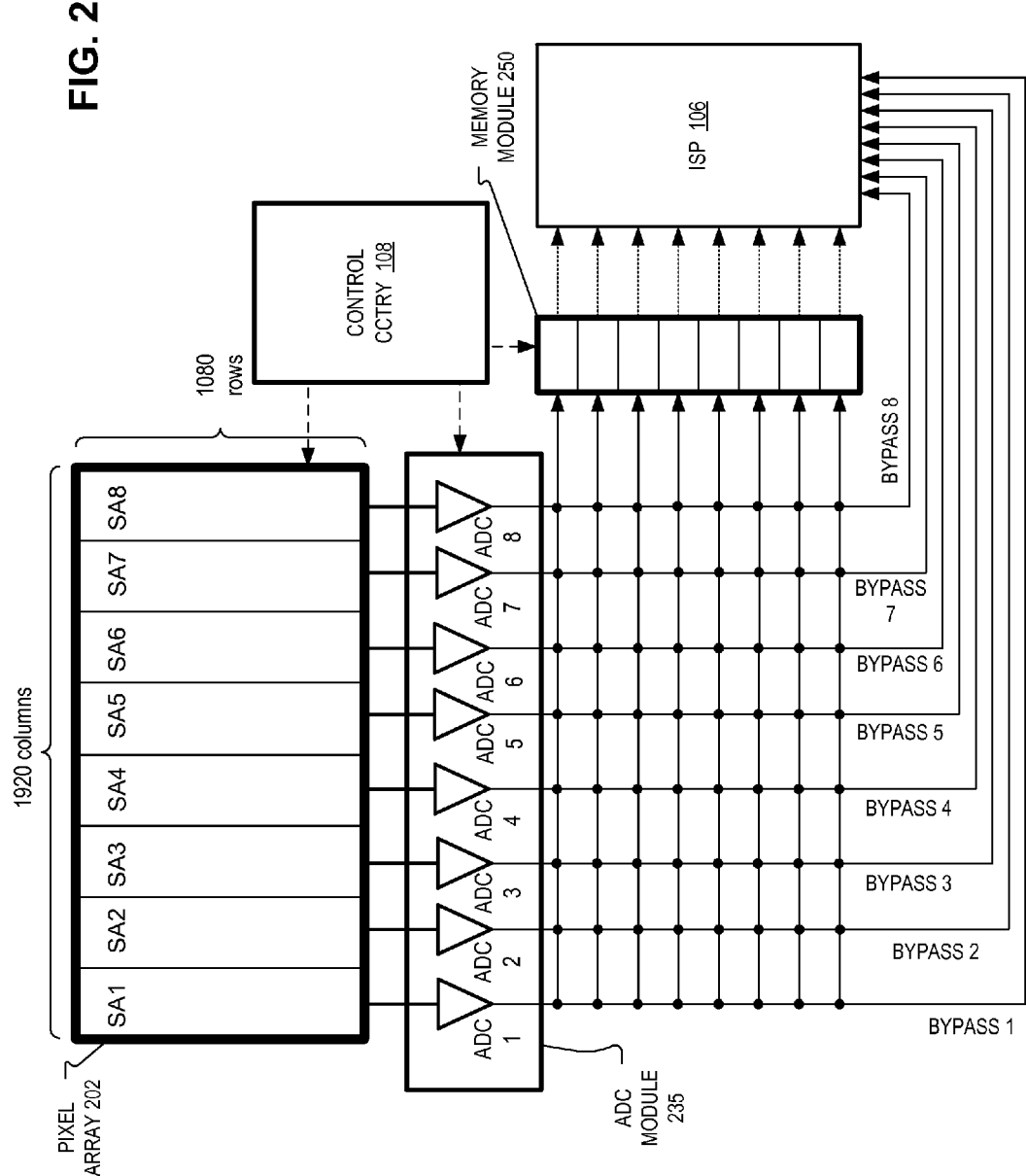
FIG. 2 illustrates a block diagram schematic including a pixel array, example readout circuitry for reading out the pixel array, and an image signal processor, in accordance with an embodiment of the disclosure.

FIG. 2 illustrates a block diagram schematic including a pixel array 202, example readout circuitry for reading out the pixel array, and image signal processor 106, in accordance with an embodiment of the disclosure. Pixel array 202 is one possible example of pixel array 102. Pixel array 202 is 1920 columns by 1080 rows of image sensor pixels, in the illustrated embodiment. In one embodiment, pixel array 202 comprises d columns by e rows of image sensor pixels, where d and e are integers. Pixel array 202 includes eight sub-arrays SA1-SA8, in FIG. 2. ADC module 235 is coupled to convert the analog image signals generated by each image pixel in pixel array 202 to digital image signals that are representative of the each respective analog image signal. A readout of a whole sub-array will be referred to as a "sub-frame." In the illustrated embodiment, each frame consists of eight sub-frames corresponding to the eight sub-arrays SA1-SA8.

In FIG. 2, eight ADC sub-modules are illustrated as ADC1-ADC8. Each sub-module is dedicated to readout a particular sub-array. For example, sub-module ADC1 is coupled to readout sub-array SA1, sub-module ADC2 is coupled to readout sub-array SA2, and so on. Each ADC sub-module may include a plurality of ADC converters. In the illustrated embodiment, each sub-array includes 240 columns and each ADC sub-module may include 240 ADC circuit so that there is a one-to-one correlation between ADC circuit and columns of the sub-array. In one embodiment, each sub-array 240 includes r columns and each ADC sub-module includes s ADC circuits, where r and s are integers. In one embodiment, r equals s; in other embodiments, r and s are different integers. Control circuitry 108 is coupled to control ADC conversions for each ADC sub-module. In other words, control circuitry 108 can individually initiate an ADC conversion for a particular ADC sub-module, but not for another ADC sub-module. ADC module 235 is a 12-bit ADC, in one embodiment. In a different embodiment, ADC module 235 is a 14-bit ADC.

Memory module 250 is coupled to receive the digital image signals from the ADC module 235. Memory module 250 includes Dynamic Random-Access Memory (DRAM), in one embodiment. In one embodiment, memory module 250 is a one-frame buffer that only includes enough memory to readout one frame of pixel array 202. For example, memory module 250 stores 2,073,600 digital words in the illustrated embodiment, which is enough to store the digital image signals from the 2,073,600 pixels in pixel array 202. In one embodiment, memory module 250 stores d×e digital words. The digital words may be 16 bits, in one embodiment to store the digital signals from 14-bit ADCs. The amount of memory required to store a sub-frame will be referred to as a "segment." Memory module 250 includes integer number q memory segments corresponding to integer number p sub-arrays where integer number p and q are the same. In FIG. 2, memory module 250 includes eight memory segments corresponding to eight sub-arrays SA1-SA8.

Each segment of memory module 250 may receive a sub-frame from any of the ADC sub-modules. Control circuitry 108 may control writing the sub-frames to different memory segments of memory module 250. Furthermore, ISP 106 may receive a sub-frame from any of the ADC sub-modules, as will be discussed. A switching network or multiplexor (not illustrated) may facilitate the transfer of sub-frames from ADC module 235 to memory module 250 and from ADC module 235 to ISP 106 in the cases where a sub-frame bypasses memory module 250. The switching network or multiplexor may be controlled by control circuitry 108. ADC module 235, memory 250 and any switching network or multiplexor may be included in readout circuitry 104.

FIG. 3 illustrates an example timing diagram showing different exposures of sub-arrays of the array of image pixels, in accordance with an embodiment of the disclosure. In particular, FIG. 3 shows the timing of a rolling shutter that starts at the first sub-array (SA1) and moves toward the last sub-array (SA8). A first exposure period is initiated at $L_I$ and is exposed until the readout at $L_R$. In one embodiment, the first exposure period is 16 ms and is considered the long exposure period. As shown, the rolling shutter of the long exposure period continues through SA2 and then later through SA3 and then continues through SA4, SA5, SA6, and SA7, and ending at SA8 (not illustrated). After the first rolling shutter exposure period, a second rolling shutter exposure period is initiated by control circuitry 108 that starts at $M_I$ and is exposed until the readout at $M_R$. In one embodiment, the second exposure period is 4 ms and is considered the medium exposure period. After the second rolling shutter exposure period, a third rolling shutter exposure period is initiated by control circuitry 108 that starts at $S_I$ and is exposed until the readout at $S_R$. In one embodiment, the third exposure period is 1 ms and is considered the short exposure period. After the third rolling shutter exposure period, a fourth rolling shutter exposure period is initiated by control circuitry 108 that starts at $U_I$ and is exposed until the readout at $U_R$. In one embodiment, the fourth exposure period is 0.25 ms and is considered the ultrashort exposure period.

In one embodiment, the first exposure is at least fifty time longer than the fourth exposure period and the second exposure period is at least three times longer than the third exposure period. Having significantly different exposure periods is generally advantageous in HDR imaging.

In operation, a long, medium, short, and ultrashort rolling shutter exposure period is initiated from SA1 through SA8 across pixel array 202. These different exposure periods give the image data to generate an HDR image. In FIG. 3, the time between readouts (TR) is evenly spaced. In one embodiment, TR is 4 ms. The initiation of the long, medium, short, and ultrashort rolling shutter exposures are not necessarily evenly spaced, as illustrated in FIG. 3.

FIG. 4 illustrates a timing diagram showing writing sub-frames to a memory module 250, in accordance with an embodiment of the disclosure. At a first readout time t1, sub-frame L1 from the first sub-array (SA1) exposed for the first exposure period is written to a first segment of memory module 250. Control circuitry selects sub-module ADC1 (but not sub-modules ADC2-ADC8) to convert the analog image signals of SA1 to digital image signals for first readout time t1.

At a second readout time t2, sub-frame L2 from the second sub-array (SA2) exposed for the first exposure period is written to a second segment of memory module 250. Also at the second readout time t2, sub-frame M1 from the first sub-array (SA1) exposed for the second exposure period is written to a seventh segment of memory module 250. Control circuitry 108 selects sub-modules ADC1 and ADC2 (but not sub-modules ADC3-ADC8) to convert the analog image signals of SA1 and SA2 to digital image signals for second readout time t2

At third readout time t3, sub-frame L3 from the third sub-array (SA3) exposed for the first exposure period is written to a third segment of memory module 250. Also at time t3, sub-frame M2 from the second sub-array (SA2) exposed for the second exposure period is written to an eighth segment of memory module 250. Sub-frame S1 from the first sub-array (SA1) exposed for the third exposure period is also written to a sixth segment of memory module 250. Note that FIG. 3 also illustrates times readout times t1, t2, and t3. Control circuitry selects sub-modules ADC1, ADC2, and ADC3 (but not sub-modules ADC4-ADC8) to convert the analog image signals of SA1, SA2, and SA3 to digital image signals for third readout time t3.

At a first write time t4, sub-frame L1, sub-frame M1, and sub-frame S1 are sent from memory 250 to ISP 106, as illustrated by the arrows on the right side of memory module 250. At a second write time subsequent to third readout time t3, a fourth sub-frame U1 is sent to ISP 106, as indicated by the arrow on the right side of the parenthetical U1. The fourth sub-frame U1 bypasses memory 250 by being sent from ADC module 235 to ISP 106 without being written to memory 250. Control circuitry 108 selects sub-module ADC1 to convert the analog image signals of SA1 to digital image signals that can be sent as the fourth sub-frame to ISP 106. ISP 106 is coupled to receive sub-frames from the ADC sub-modules of ADC module 235 and a switch network or multiplexor may facilitate the sub-frames bypassing memory 250 at the appropriate times. The fourth sub-frame U1 is generated by the first sub-array (SA1) exposed for the fourth exposure period.

Having the fourth sub-frame bypass memory module 250 reduces the buffer memory needed to generate an HDR image. In one embodiment, the second write time is subsequent to the first write time and the first, second, third, and fourth sub-frame are received by ISP 106 sequentially, in that order. Therefore, ISP 106 is able to receive four different sub-frames of the same sub-array (e.g. SA1) that have different exposure periods in order. The ISP is then able to apply an HDR algorithm to the four sub-frames to generate an HDR sub-frame. Once all the sub-frames from all the sub-arrays are received, a full HDR frame will be generated.

Referring to time t5, sub-frames M3, L4, and S2 are written to memory module 250, as indicated by the arrows to the left of memory 250. At time t6, sub-frames L2, S2, and M2 are sent from memory 250 to ISP 106, as indicated by the arrows to the right of memory module 250. Sub-frame U2 is also sent to ISP 106 (bypassing memory 250) after time t5, as indicated by the arrow on the right side of the parenthetical U2.

Referring to time t7, sub-frames M4, L5, and S3 are written to memory module 250, as indicated by the arrows to the left of memory 250. At time t8, sub-frames L3, S3, and M3 are sent from memory 250 to ISP 106, as indicated by the arrows to the right of memory module 250. Sub-frame U3 is also sent to ISP 106 (bypassing memory 250) after time t7, as indicated by the arrow on the right side of the parenthetical U3.

After time t7, each segment of memory contains a sub-frame. However, since the ultrashort sub-frame from each sub-array is able to bypass being written to memory, only eight segments of memory (one total frame) are needed at one time while still being able to feed ISP 106 all of the sub-frames that are readout. In previous approaches, one full frame buffer was used for each exposure period. In other words, if the HDR image incorporated four exposure periods, four frames worth of buffer memory was used to store the four frames of the different exposure periods. However, in the disclosed approach, only one frame worth of buffer memory is used even while four frames of different exposures are ultimately captured. In addition to reducing the frame buffer memory, the disclosed embodiments may also reduce the readout time of the different exposure frames when compared to serially reading out each frame one after the other.

FIG. 4 continues to illustrate memory 250 receiving three sub-frames during each readout time t9, t11, t13, t15, and t17, and ISP 106 receiving four sub-frames at times t10, t12, t14, t16, and t18 to complete the readout of four total frames having four different respective exposure periods. ISP 106 is then able to process these four total frames into one HDR image using one or more of the HDR algorithms known in the art. One potential advantage of this feature is that ISP 106 can start applying HDR algorithms very early as it receives the four different exposure sub-frames from SA1 in the earliest data it receives. Therefore, ISP 106 may generate the final HDR image faster than previous approaches that don't receive all the different exposures early on. After ISP 106 generates an HDR image, the HDR image may be sent to MIPI 116. At t15, sub-frame L1 from the next successive frame is loaded into memory module 250. At t17, sub-frame L2 is loaded into memory module 250.

In one embodiment, HDR imaging system 100 may be implemented in a stacked chip architecture where pixel array 102 is includes in a first semiconductor layer that is bonded to a second semiconductor layer that includes memory module 250 and ISP 106.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method of reading out an array of image pixels that are capturing a high dynamic range (HDR) image having multiple exposure periods, the method comprising:

writing a first, second, and third sub-frame to a memory at a first, second, and third readout time, respectively, the first, second, and third sub-frame being generated by a same first sub-array of the array of image pixels, wherein the third readout time is subsequent to the second readout time and the second readout time is subsequent to the first readout time, and wherein the first sub-frame is exposed for a first exposure period, the second sub-frame is exposed for a second exposure period shorter than the first exposure period, and the third sub-frame is exposed for a third exposure period shorter than the second exposure period;

sending the first, second, and third sub-frame to an image signal processor at a first write time subsequent to the third readout time;

and sending a fourth sub-frame to the image signal processor at a second write time subsequent to the third readout time, the fourth sub-frame being generated by the same first sub-array of the array of image pixels exposed for a fourth exposure period shorter than the third exposure period, wherein the fourth sub-frame bypasses the memory by being sent from an analog-to-digital converter to the image signal processor without being written to the memory, wherein the second write time is subsequent to the first write time, and wherein the first, second, third, and fourth sub-frame are received by the image signal processor sequentially, in that order, during the first write time and the second write time.

2. The method of claim 1, wherein the memory is a one-frame buffer that includes an integer number n memory locations that is equal to an integer number m pixels in the array of image pixels.

3. The method of claim 2, wherein the array of image pixels includes an integer number p sub-arrays, and wherein the memory includes an integer number q segments that store digital image signals representative of analog image signals generated by each respective sub-array, the integer number p and the integer number q being the same.

4. The method of claim 1, wherein the memory can only store eight sub-frames at once, and wherein the array of image pixels includes eight sub-arrays.

5. The method of claim 1, wherein the first, second, and third readout time are evenly spaced.

6. The method of claim 1, wherein the first exposure period is at least fifty times longer than the fourth exposure period.

7. The method of claim 6, wherein the second exposure period is at least three times longer than the third exposure period.

8. The method of claim 1 further comprising:
applying an HDR algorithm to the first, second, third, and fourth sub-frames with the image signal processor to generate an HDR sub-frame of the HDR image.

9. The method of claim 8 further comprising:
sending the HDR image from the image signal processor to a Mobile Industry Processor Interface (MIPI).

10. The method of claim 1, wherein the first, second, third, and fourth sub-frames are captured using first, second, third, and fourth rolling shutters starting at the first sub-array of image pixels and moving toward a last sub-array of image pixels of the array of image pixels, the first, second, third, and fourth rolling shutters having the first, second, third, and fourth exposure periods, respectively.

11. The method of claim 10, wherein an initiation of the first, second, third, and fourth rolling shutters are not evenly spaced.

12. The method of claim 1, wherein the array of image pixels is included in a stacked chip image sensor including a first semiconductor layer that includes the array of image pixels and a second semiconductor layer including the memory and the image signal processor, wherein the first semiconductor layer and the second semiconductor layer are bonded together.

13. A high dynamic range (HDR) imaging system comprising:
an array of image pixels;
control circuitry coupled to the array of image pixels to initiate image captures having different exposure periods;
an image signal processor (ISP);
an analog-to-digital converter module coupled to readout analog image signals from the array of image pixels; and
a memory coupled to receive digital image signals that are representative of the analog image signals, wherein the HDR imaging system includes a non-transitory machine-accessible medium configured to:
writing a first, second, and third sub-frame to the memory at a first, second, and third readout time, respectively, the first, second, and third sub-frame being generated by a same first sub-array of the array of image pixels, wherein the third readout time is subsequent to the second readout time and the second readout time is subsequent to the first readout time, and wherein the first sub-frame is exposed for a first exposure period, the second sub-frame is exposed for a second exposure period shorter than the first exposure period, and the third sub-frame is exposed for a third exposure period shorter than the second exposure period;
sending the first, second, and third sub-frame to the ISP at a first write time subsequent to the third readout time; and
sending a fourth sub-frame to the ISP at a second write time subsequent to the third readout time, the fourth sub-frame being generated by the same first sub-array of the array of image pixels exposed for a fourth exposure period shorter than the third exposure period, wherein the fourth sub-frame bypasses the memory by being sent from the analog-to-digital converter module to the ISP without being written to the memory,
wherein the second write time is subsequent to the first write time, and wherein the first, second, third, and fourth sub-frame are received by the ISP sequentially, in that order, during the first write time and the second write time.

14. The HDR imaging system of claim 13, wherein the memory is a one-frame buffer that includes an integer number n memory locations that is equal to an integer number m pixels in the array of image pixels.

15. The HDR imaging system of claim 14, wherein the array of image pixels includes an integer number p sub-arrays, and wherein the memory includes an integer number q segments that store the digital image signals that are representative of the analog image signals generated by each respective sub-array, the integer number p and the integer number q being the same.

16. The HDR imaging system of claim 13, wherein the array of image pixels is included in a stacked chip image sensor including a first semiconductor layer that includes the array of image pixels and a second semiconductor layer including the memory and the ISP, wherein the first semiconductor layer and the second semiconductor layer are bonded together.

* * * * *